3,641,170
ETHYLENE TELOMERIZATION
Kay L. Nakamaye, Moraga, Lynn H. Slaugh, Lafayette, William W. Spooncer, Walnut Creek, and Hendrik C. Volger, Richmond, Calif., assignors to Shell Oil Company, New York, N.Y.
No Drawing. Filed June 11, 1969, Ser. No. 832,465
Int. Cl. C07c 17/28, 67/00
U.S. Cl. 260—658 C      7 Claims

ABSTRACT OF THE DISCLOSURE

Ethylene and organic iodides are telomerized to higher-molecular-weight organic iodide products in the presence of iron, nickel, copper, zinc or cadmium metal as catalyst.

BACKGROUND OF THE INVENTION

The telomerization of ethylene and alkyl halides is known in the art. This reaction involves the addition of ethylene, called a taxogen, to an alkyl halide, called a telogen, to produce a product, called a telomer, as depicted in the following Equation 1:

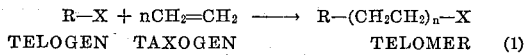

$$\text{R—X} + n\text{CH}_2{=}\text{CH}_2 \longrightarrow \text{R—(CH}_2\text{CH}_2)_n\text{—X} \quad (1)$$
$$\text{TELOGEN} \quad \text{TAXOGEN} \quad\quad\quad \text{TELOMER}$$

wherein R—X represents an alkyl halide.

One telomerization process is that disclosed by U.S. 2,533,052 of Schmerling, issued Dec. 5, 1950, which involves the reaction of ethylene with alkyl chlorides to produce higher alkyl chloride telomer products in the presence of boron trifluoride as catalyst. This process, however, is useful only for incorporating only one of two ethylene moieties into the alkyl chloride reactant. Another type of telomerization process is free-radical initiated reactions between ethylene and alkyl iodides. One free-radical initiated telomerization process is that of Katsobashvili et al., Polymer Science (U.S.S.R.) 7, 908 (1965) wherein ethylene and ethyl iodide are telomerized in the presence of azomisisobutylronitrile as the free-radical initiator. The process of Katsobashvili produces telomer products which incorporate up to 5 ethylene moieties into the ethyl iodide reactant. However, the chemical free-radical initiator of the Katsobashvili process is consumed during the telomerization process, e.g., the azobisisobutyronitrile is decomposed into free-radical fragments which cannot be recovered for subsequent use. It would be of advantage, however, to produce high-molecular telomer products of ethylene and organic iodides by a catalytic process which does not involve the consumption of the catalyst initiator.

SUMMARY OF THE INVENTION

It has now been found that ethylene is telomerized with organic iodides to produce higher molecular-weight organic iodide telomers in the presence of iron, nickel, copper, zinc or cadmium metal as catalyst. By way of illustration, the telomerization of ethylene and ethyl iodide in the presence of iron metal produces a telomer product mixture of even-carbon-number $C_4$–$C_{20}$ primary normal alkyl iodides. The metal catalyst of the process is of particular advantage in that the spent catalyst can be regenerated by treatment with hydrogen at elevated temperatures.

DESCRIPTION OF PREFERRED EMBODIMENTS

The catalyst.—The telomerization catalyst of the invention is iron, nickel, copper, zinc or cadmium metal. Although any commercially available grade of reasonable purity is generally suitable, finely-divided grades of the metal catalyst, e.g., powder or dust, are preferred. Preferred metal catalysts are iron and copper.

The metal catalyst is suitably employed as an unsupported material. In certain modifications, however, it has been found desirable to employ the metal catalyst supported on inorganic, solid catalyst carriers which are normally solid under reaction conditions and are heterogeneous, i.e., are substantially insoluble in the telomerization reaction medium. Illustrative of siutable inorganic, solid catalyst carriers are inorganic oxides known as siliceous refractory oxides. Suitable siliceous refractory oxides oxides include synthetic products such as silica, silica-alumina, silica-magnesia, and silica-titania as well as acid treated clays and similar materials such as kieselguhr or crystalline macroreticular aluminosilicates known in the art as molecular sieves.

When the metal catalyst is supported, the amount of metal to carrier is not critical. In general, amounts of metal from about 0.1% to about 70% by weight, based on total catalyst composition, are satisfactory. The metal is introduced onto the carrier by any conventional method. In one method, the supported metal catalyst is prepared by intimately contacting a metal salt, e.g., copper chloride, with a carrier material in an inert diluent and subsequently reducing the metal salt to the elemental metal form with hydrogen.

The metal catalyst is employed in amounts which are minor relative to the organic iodide reactant. Molar ratios of metal catalyst, calculated as the metal, to organic iodide reactant from about 1:10 to about 1:10,000 are satisfactory with molar ratios from about 1:20 to about 1:1000 being preferred.

The organic iodide reactant.—The process of the invention is generally applicable to any organic iodide compound of from 1 to 41 carbon atoms containing a nontertiary iodide group attached to a saturated carbon atom in which the remaining valences of the carbon atom are satisfied by bonding to hydrogen or carbon atoms. By the term "saturated" carbon atom is meant a carbon atom whose valences are satisfied by single bonds, i.e., free from multiple unsaturation.

The organic iodide reactant is hydrocarbon iodide compound containing only carbon and hydrogen other than the iodide groups or is a substituted-hydrocarbon iodide compound additionally containing non-interfering substituents. One class of suitable iodide reactants is represented by the Formula I:

$$\text{R—}\underset{\underset{\text{R}}{|}}{\overset{\overset{\text{H}}{|}}{\text{C}}}\text{—I} \quad\quad (\text{I})$$

wherein R independently is hydrogen or an organo group of up to 20 carbon atoms, preferably of up to 10 carbon atoms, with the proviso that organo R groups are bonded to the carbon atom attached to the iodide group through a saturated carbon atom and with the further proviso that two organo R groups may together form a carbocyclic ring with 5 to 9 carbon atoms in the ring thereof.

The R groups are hydrocarbyl, that is, contain only atoms of carbon and hydrogen, or are substituted-hydrocarbyl containing, besides atoms of carbon and hydrogen, other atoms such as oxygen, nitrogen and halogen, particularly halogen of atomic number from 9 to 53 inclusive, which atoms are present in functional groups such as alkoxy, aryloxy, carboalkoxy, alkanoyl, alkanoyloxy, cyano, halo and like groups having no active hydrogen atoms. A preferred class of non-hydrocarbyl substituents are halogens of atomic number from 17 to 53 inclusive. It is appreciated, of course, that R groups containing iodo substituents on aliphatic saturated carbon atoms provide additional reactive sites for insertion of ethylene.

Illustrative of hydrocarbyl R groups are alkyl groups such as methyl, ethyl, propyl, isopropyl, butyl, pentyl, decyl, lauryl and stearyl; cycloalkyl groups such as cyclopropyl, cyclobutyl, cyclopentyl, cyclohexyl, methylcycloheptyl and cyclodecyl; alkenyl groups such as allyl, but-4-enyl, and dec-9-enyl; cycloalkenyl groups such as cyclopent-2-enyl, cyclohex-3-enyl, 4-methylcyclohex-2-enyl and cyclooct-4-enyl and cyclodec-5-enyl; alkynyl groups such as 2-propynyl, 3-butynyl and 5-decynyl; and aralkyl groups such as benzyl, 2-phenylethyl, 4-naphthylbutyl and 5-(p-totyl)-hexyl.

Illustrative of substituted-hydrocarbyl R groups include substituted-alkyl groups such as fluoromethyl, chloromethyl, bromomethyl, iodomethyl, fluoroethyl, bromoethyl, iodoethyl, 3-iodopropyl, 4-chlorobutyl, 5-bromopentyl, 4-fluorohexyl, 6-iodooctyl, methoxymethyl, 3-phenoxypropyl, 4-carbethoxybutyl, 3-oxoheptyl, 8-acetoxyoctyl, and 10-cyanodecyl; substituted-cycloalkyl groups such as 2-fluorocyclopropyl, 3-iodocyclohexyl, 4-carbomethoxycyclobutyl, 3-methoxycycloheptyl, 4-benzyloxycyclohexyl, and 2-cyanocyclopentyl; substituted-alkenyl groups such as 10-iododec-5-enyl, 4-cyanobut-2-enyl and 4-methoxyhept-6-enyl; substituted-cycloalkenyl such as 4-methoxycyclohex-2-enyly, 4-cyanocyclohex-2-enyl and 5-iodocyclohex-2-enyl; and substituted-aralkyl groups such as 4-chlorobenzyl, 2-(p-chlorophenyl)propyl, 4(α-cyanonaphthyl)pentyl and 5-(p-totyl)-α-chlorohexyl.

Exemplary iodide compounds of Formula I therefore include hydrocarbyl monoiodides such as alkyl iodides, e.g., methyl iodide, ethyl iodide, propyl iodide, isopropyl iodide, n-butyl iodide, n-pentyl iodide, n-hexyl iodide, n-octyl iodide, n-decyl iodide and lauryl iodide; alkenyl iodides, e.g., but-3-enyl iodide, hex-5-enyl iodide, oct-7-enyl iodide and dec-6-enyl iodide; alkynyl iodides, e.g., 3-butynyl iodide and 8-octynyl iodide; cycloalkyl iodides, e.g., cyclopentyl iodide, cyclohexyl iodide, 4-methylcyclohexyl iodide, 4-cyclopropylbutyl iodide, and cyclodecyl iodide; cycloalkenyl iodides, e.g., 3-cyclohexenyl iodide and 4-cyclooctenyl iodide; bicyclic iodide compounds such as 2-iodobicyclo(3.3.0)octane, (dicyclohexyl)methyl iodide and (4-cyclohexyl)cyclohexyl iodide; and aralkyl iodides, e.g., 4-phenylbutyl iodide, 5-naphthylpentyl iodide and 4-phenylcyclohexyl iodide.

Exemplary iodide compounds of Formula I containing substituted hydrocarbyl substituents are halohydrocarbons such as dihaloalkanes, e.g., 2-chloroethyl iodide, 3-fluoropropyl iodide, 1,3-diiodopropane, 4-dichlorobutyliodide, 1,4-diiodobutane, 5-bromopentyl iodide, 1,5-diiodopentane, 7-chloroheptyliodide, 10-bromodecyliodide, 1,16-diiodooctadecane, and 1,19-diiodononadecane; dihalocycloalkanes, e.g., 1,4-diiodocyclohexane, 4-chlorocyclohexyl iodide, 1,4-(iodomethyl)cyclohexane, and (3-chloromethyl)cyclohexyl iodide; and 4-(p-chlorophenyl)butyl iodide; iodide compounds containing oxygen functional groups such as 4-methoxybutyl iodide, 5-phenoxyphenyl iodide, 6-carbethoxyhexyl iodide, 4-oxooctyl iodide, 10-acetoxydecyl iodide, 8-ethoxyoctadecyl iodide, 4-chlorocyclohex-2-enyl iodide, 5-(p-acetoxyphenyl)pentyl iodide and 16-acetoxyhexadec-4-enyl iodide; and iodide compounds containing cyano groups such as 5-cyanopentyl iodide, 4-cyanocyclohexyl iodide and 4-(p-cyanophenyl)butyl iodide.

In general, iodide compounds of Formula I wherein the R groups are saturated aliphatic, e.g., alkyl or halo-substituted-alkyl, are preferred over the R' groups containing carbon-carbon unsaturation, e.g., olefinic, acetylenic or aromatic unsaturation. Particularly preferred iodide compounds are those wherein one R group is hydrogen, e.g., primary saturated aliphatic iodides, ad most preferred iodide compounds are lower (R is n-alkyl of from 1 to 4 carbon atoms) primary normal alkyl monoiodides, especially ethyl iodide.

The molar ratio of organic iodide reactant to ethylene is not critical, although it is generally useful to employ an excess of ethylene. In general, molar ratios of organic iodide to ethylene of from about 1:1 to about 1:100 are satisfactory, with molar ratios from about 1:5 to about 1:20 being preferred. The ethylene is generally provided at initial pressures of from about 100 p.s.i.g. to 5000 p.s.i.g.

The reaction conditions.—The telomerization process is conducted in the liquid phase in the presence of a reaction diluent which is liquid at reaction temperature and pressure, is capable of dissolving the reactants and is inert to the reactants, catalyst and the products produced therefrom. Suitable diluents are non-hydroxylic compounds such as hydrocarbons free from aliphatic unsaturation, e.g., hexane, heptane, octane, decane, dodecane, cyclohexane, tetrahdronaphthalene, benzene, toluene and xylene. Preferred reaction diluents comprise mononuclear aromatic hydrocarbons, including alkylaromatics, of from 6 to 12 carbon atoms. In certain modifications of the process, a portion of the reactants and telomer products suitably serves as at least a portion of the reaction diluent and no or less diluent is required. In most instances, added diluent is used and amounts of reaction diluent up to about 30 times the weight of oragnic iodide reactant are typically employed.

The teleomerization process is conducted by any of a variety of procedures. In one modification, the ethylene, iodide reactant, catalyst and diluent are charged to an autoclave or similar pressure reactor for operation in a batchwise manner. In another modification, the process is effected in a continuous manner as by passing the ethylene and organic iodide in a liquid phase solution in the reaction diluent through a reaction zone in which the metal catalyst, preferably supported, is maintained. In still another modification, one reaction component is added to the other reaction components in increments, as by adding ethylene to a solution of the organic iodide reactant and catalyst. By any modification, the process is most efficiently conducted at elevated temperature and pressure. In general, temperatures varying from about 50° C. to about 250° C. are satisfactory with temperatures from about 75° C. to about 200° C. being preferred. Suitable reaction pressures are those which serve to maintain the reaction mixture substantially in the liquid phase. Reaction pressures from about 10 atmospheres to about 200 atmospheres in general are satisfactory. The telomerization process is suitably conducted in an inert reaction environment so that the presence of reactive materials such as water and oxygen is desirably avoided. Reaction conditions are therefore substantially anhydrous and substantially oxygen-free.

At the conclusion of the reaction, the product mixture is separated and the organic iodide telomer product is recovered by conventional means such as fractional distillation, selective extraction, adsorption and the like. Unreacted organic iodide reactant, solvent and/or catalyst are suitably recycled for additional conversion.

It has been found that during the telomerization a small amount of the metal catalyst is converted to metal compounds, e.g., metal iodides. In certain modifications of the process, it is desirable to treat the recovered or spent metal catalyst containing such metal compounds with hydrogen to reduce the metal compounds back to the active metal catalyst. The hydrogen treatment of the recovered catalyst is generally conducted at elevated temperatures and pressures. Suitable temperatures vary from about 200° C. to 600° C. and suitable hydrogen pressures vary from about 100 p.s.i.g. to 200 p.s.i.g. In a preferred method of hydrogen treatment, the recovered catalyst is contacted with a mixture of carbon monoxide and hydrogen. The ratio carbon monoxide to hydrogen is not critical, and molar ratios of carbon monoxide to hydrogen of from 5:1 to 1:5 are satisfactory. Alternatively, the telomerization process is suitably conducted in the presence of hydrogen or a mixture of hydrogen and carbon monoxide so that any metal compounds formed during the telomerization process are continuously reconverted to the elemental metal form. In this modification, suitable hydrogen pressures vary from 100 p.s.i.g. to 2000 p.s.i.g. When a mixture of hydrogen and carbon monoxide is employed, suitable molar ratios of carbon monoxide to hydrogen of from about 5:1 to 1:5 are satisfactory.

The organic iodide telomer products.—According to the process of the invention ethylene moieties are added to organic iodides to produce higher-molecular-weight organic iodide products. By way of illustration the reaction of ethylene and the organic iodide represented by Formula I is depicted in Equation 2

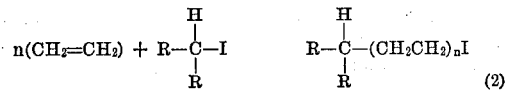

wherein $n$ represents the number of ethylene molecules inserted. Primary normal alkyl iodide reactants are converted to the corresponding linear higher-molecular-weight primary alkyl iodides.

The organic iodide products are materials of established utility. For example, the iodide products are converted to olefins and/or alcohols by solvolysis in water or aqueous base, e.g., sodium hydroxide. The product olefins are converted by conventional "Oxo" processes to aldehydes which are hydrogenated with conventional catalysts to the corresponding alcohols. The $C_{12}$–$C_{20}$ alcohol products are ethoxylated as by reaction with ethylene oxide in the presence of a basic catalyst, e.g., sodium hydroxide, to form conventional detergents and the lower molecular weight alcohols are esterified by reaction with polybasic acids, e.g., phthalic acid, to form plasticizers for polyvinyl chloride.

EXAMPLE I

A series of telomerization reactions of ethylene with ethyl iodide in the presence of iron, nickel, cadmium, copper and zinc metal as catalyst was conducted by charging the entire amounts of the reaction components and each metal catalyst to an 80 ml. autoclave. Each reaction was conducted with 0.1 g. metal catalyst, 3.1 g. of ethyl iodide, 30 ml. of benzene solvent and at an initial ethylene pressure of 1500 p.s.i.g. The reaction conditions and the results are provided in Table I. With each metal catalyst, no or less than 1 mole percent of branched-chain alkyl iodide telomer products were observed.

TABLE I

| Catalyst | Fe | Cu | Cd | Zn | Ni |
|---|---|---|---|---|---|
| Reaction temp., °C | 185 | 180 | 175 | 125 | 175 |
| Reaction time, hours | 60 | 60 | 17 | 17 | 72 |
| Ethyl iodide conversion, percent | 96 | 95 | 44 | 49 | 30 |
| n-Alkyl iodide product, mole percent: | | | | | |
| $C_4$ | 34 | 17 | 38 | 28 | 53 |
| $C_6$ | 21 | 20 | 28 | 24 | 28 |
| $C_8$ | 17 | 23 | 15 | 16 | 14 |
| $C_{10}$ | 15 | 20 | 10 | 10 | 4 |
| $C_{12}$ | 9 | 17 | 5 | 8 | 1 |
| $C_{14}$ | 4 | 3 | 2 | 6 | |
| $C_{16}l$ | | 2 | 1 | 8 | |

EXAMPLE II

A commercial copper on kieselguhr composition (50–55% wt. Cu) was treated with hydrogen at 500° C. for several hours. A 0.58 g. sample of the pretreated copper on kieselguhr composition was contacted with 3.12 g. of ethyl iodide in a solvent mixture of 26.7 g. of n-heptane and n-nonane in an 80 ml. autoclave under 1080–1175 p.s.i.g. of ethylene at a temperature of 190–200° C. for 16 hours. Gas liquid chromatographic analysis showed a 27.8% conversion of ethyl iodide to a product mixture comprising $C_4$, $C_6$, $C_8$, $C_{10}$, $C_{12}$ and $C_{14}$ n-alkyl iodide products.

The copper on kieselguhr catalyst was recovered from the reaction mixture and treated with hydrogen at 500° C. for 15 hours. The resulting composition was contacted with ethyl iodide and ethylene by a procedure similar to that employed above. Gas chromatographic analysis of the reaction mixture showed a 27% conversion of ethyl iodide to a product mixture comprising $C_4$, $C_6$, $C_8$, $C_{10}$, $C_{12}$ and $C_{14}$ n-alkyl iodide telomers.

EXAMPLE III

By a procedure similar to that of Example I, copper is employed as a catalyst for the telomerization of ethylene with each of the following organic iodide reactants: cyclohexyl iodide, n-pentyl iodide, 1,5-diiodopentane, 4-cyanobutyl iodide and 4-acetoxybutyl iodide. A good yield of telomer products produced by the insertion of up to 10 ethylene moieties between the iodide-carbon bond of the organic iodide is obtained with each organic iodide reactant.

EXAMPLE IV

A mixture of 0.48 mole of methanol, 0.002 mole of methyl iodide, 0.001 mole of copper metal and 400 p.s.i.g. of ethylene was charged to an autoclave. The autoclave was heated at 120° C. for 4 hours and then at 150° C. overnight. During this heating period, no ethylene pressure drop was detected. After cooling to 25° C., gas chromatographic analysis of the product mixture showed no detectable amounts of iodide or alcohol telomer products.

EXAMPLE V

A mixture of 2.4 mole of methanol, 0.5 mole of methyl iodide, 0.025 mole of iron powder and 600 p.s.i.g. of ethylene was charged to an autoclave. The autoclave was heated at 120° C. for 4 hours and then at 150° C. overnight. During this heating period, no ethylene pressure drop was detected. After cooling to 125° C., gas chromatographic analysis of the product mixture showed no detectable amounts of iodide or alcohol telomer products.

We claim as our invention:

1. The process of telomerizing ethylene and organic iodides by contacting ethylene and an organic iodide represented by the formula:

wherein R independently is hydrogen, alkyl of up to 10 carbon atoms or halo-substituted alkyl of up to 10 carbon atoms in the presence of a metal catalyst selected from the group consisting of iron, nickel, copper, zinc and cadmium in the liquid phase in a non-hydroxylic inert reaction diluent at a temperature of from about 50° to about 250° C.

2. The process of claim 1 wherein one R group of the organic iodide is hydrogen.

3. The process of claim 2 wherein one R group is n-alkyl of from 1 to 4 carbon atoms and one R group is hydrogen.

4. The process of claim 3 wherein the metal is iron or copper.

5. The process of claim 1 wherein the ethylene is provided at an initial pressure of 100 p.s.i.g. to 5000 p.s.i.g.

6. The process of claim 1 wherein the iron, nickel, copper, zinc or cadmium is supported on an inorganic oxide catalyst support.

7. The process of claim 1 wherein the reaction diluent is hydrocarbon.

References Cited

UNITED STATES PATENTS

| 3,113,159 | 12/1963 | Hoffman et al. | 260—658 CX |
| 3,248,435 | 4/1966 | Schmerling | 260—648 RX |
| 3,262,965 | 7/1966 | Janz | 260—465.3 X |
| 3,413,332 | 11/1968 | Schmerling | 260—491 X |

LEON ZITVER, Primary Examiner

J. A. BOSKA, Assistant Examiner

U.S. Cl. X.R.

260—648 R, 491, 465.7